United States Patent
Iwaya et al.

(10) Patent No.: US 10,246,550 B2
(45) Date of Patent: Apr. 2, 2019

(54) RESIN COMPOSITION

(71) Applicant: NAMICS Corporation, Niigata (JP)

(72) Inventors: Kazuki Iwaya, Niigata (JP); Fuminori Arai, Niigata (JP); Akikazu Matsuda, Kagawa (JP); Naoto Okumura, Kagawa (JP); Takeshi Kumano, Kagawa (JP)

(73) Assignee: NAMICS CORPORATION, Niigata (JP)

(*) Notice: Subject to any disclaimer, the term of this patent is extended or adjusted under 35 U.S.C. 154(b) by 36 days.

(21) Appl. No.: 15/556,978

(22) PCT Filed: Mar. 10, 2016

(86) PCT No.: PCT/JP2016/057549
§ 371 (c)(1),
(2) Date: Sep. 8, 2017

(87) PCT Pub. No.: WO2016/143847
PCT Pub. Date: Sep. 15, 2016

(65) Prior Publication Data
US 2018/0051128 A1 Feb. 22, 2018

(30) Foreign Application Priority Data

Mar. 12, 2015 (JP) .................. 2015-049063

(51) Int. Cl.
| | |
|---|---|
| C08K 3/34 | (2006.01) |
| C08K 5/37 | (2006.01) |
| C08G 59/66 | (2006.01) |
| C08G 59/68 | (2006.01) |
| C08L 63/00 | (2006.01) |
| C09J 163/00 | (2006.01) |

(52) U.S. Cl.
CPC ........... *C08G 59/66* (2013.01); *C08G 59/686* (2013.01); *C08K 3/34* (2013.01); *C08K 5/37* (2013.01); *C08L 63/00* (2013.01); *C09J 163/00* (2013.01)

(58) Field of Classification Search
CPC ........ C08G 59/66; C08G 59/686; C08K 3/34; C08K 5/37; C08L 63/00; C09J 160/00
See application file for complete search history.

(56) References Cited

U.S. PATENT DOCUMENTS

| 5,430,112 A | 7/1995 | Takeuchi |
| 2016/0289237 A1 | 10/2016 | Mizobe |
| 2017/0073459 A1 | 3/2017 | Arai |

FOREIGN PATENT DOCUMENTS

| JP | 06211969 | | 8/1994 |
| JP | 06211970 | | 8/1994 |
| JP | 2012153794 | A1 | 8/2012 |
| JP | 2015059099 | A2 | 3/2015 |
| WO | 2015080241 | A1 | 6/2015 |
| WO | 2015141347 | A1 | 9/2015 |

OTHER PUBLICATIONS

International Search Report dated Apr. 5, 2016 filed in PCT/JP2016/057549.

*Primary Examiner* — Shane Fang
(74) *Attorney, Agent, or Firm* — Rankin, Hill & Clark LLP

(57) ABSTRACT

There is provided a resin composition which can be thermoset at a temperature of approximately 80° C., and has excellent PCT resistance and a long pot life. This resin composition is suitable as a one-component adhesive agent to be used during the manufacture of image sensor modules or electronic components. The resin composition according to the present invention is a resin composition having the following characteristics. The resin composition includes (A) a compound represented by formula (1) below, an oligomer having as its basic skeleton a structure represented by formula (2) below, (C) an epoxy resin, and (D) a curing accelerator. The mass ratio ((B)/(A)) between the compound of the (A) component and the oligomer of the (B) component is 5 to 25%. Furthermore, the total content of the compound of the (A) component and the oligomer of the (B) component is 0.5 equivalents to 2.5 equivalents in terms of the ratio of the thiol equivalent of the compound of the (A) component and the oligomer of the (B) component with respect to the epoxy equivalent of the (C) component. In addition, the chloride ion concentration in the resin composition is 230 ppm or less.

16 Claims, No Drawings

RESIN COMPOSITION

TECHNICAL FIELD

The present invention relates to a resin composition suitable for a one-component adhesive agent in the uses which require thermosetting at a relatively low temperature, specifically at approximately 80° C. The resin composition according to the present invention is suitable as a one-component adhesive agent to be used during the manufacture of image sensor modules used as camera modules for cellular phones or smart phones, and electronic components such as semiconductor elements, integrated circuits, large-scale integrated circuits, transistors, thyristors, diodes, and capacitors. Furthermore, the resin composition according to the present invention is also expected to be used as a liquid sealing material which is used during the manufacture of semiconductor devices.

BACKGROUND ART

When manufacturing image sensor modules used as camera modules for cell phones and smart phones, there is used a one-component adhesive agent which is thermoset at a relatively low temperature, specifically at approximately 80° C. When manufacturing electronic components such as semiconductor elements, integrated circuits, large-scale integrated circuits, transistors, thyristors, diodes, and capacitors, there is also preferably used a one-component adhesive agent which is thermoset at approximately 80° C. As a one-component adhesive agent which can be cured at low temperature and satisfies these requirements, there is known a thiol adhesive agent containing as essential components an epoxy resin, a polythiol compound, and a curing accelerator (for example, see Patent Literatures 1 and 2).

Also, a one-component adhesive agent to be used during the manufacture of image sensor modules or electronic components is required to have moisture resistance. Accordingly, this one-component adhesive agent is required to be excellent in PCT (pressure cooker test) resistance.

A known thiol adhesive agent can be thermoset at a temperature of approximately 80° C. However, it became clear that this thiol adhesive agent is insufficient in PCT resistance.

Also, the one-component adhesive agent to be used during the manufacture of image sensor modules or electronic components desirably has a long pot life.

CITATION LIST

Patent Literature

Patent Literature 1: JP-A-6-211969
Patent Literature 2: JP-A-6-211970

SUMMARY OF THE INVENTION

Problems to be Solved by the Invention

An object of the present invention is to provide a resin composition which is suitable as a one-component adhesive agent to be used during the manufacture of image sensor modules or electronic components, in order to solve the above-described problems of known technologies. This resin composition can be thermoset at a temperature of approximately 80° C., and has excellent PCT resistance and a long pot life.

Solution to the Problems

To achieve the object, the present invention provides a resin composition including:

(A) a compound represented by formula (1) below;

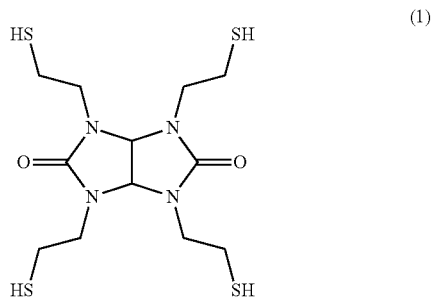 [SMILES: O=C1N(CCS)C2C(N1CCS)N(CCS)C(=O)N2CCS]

(B) an oligomer having as its basic skeleton a structure represented by formula (2) below;

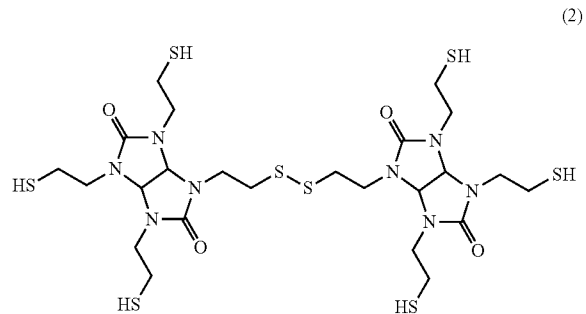 [SMILES: O=C1N(CCS)C2C(N1CCS)N(CCSSCCN1C(=O)N(CCS)C3C1N(CCS)C(=O)N3CCS)C(=O)N2CCS]

(C) an epoxy resin; and
(D) a curing accelerator.

The mass ratio ((B)/(A)×100) between the compound of the (A) component and the oligomer of the (B) component is 5 to 25%, the total content of the compound of the (A) component and the oligomer of the (B) component is 0.5 equivalents to 2.5 equivalents in terms of the ratio of the thiol equivalent of the compound of the (A) component and the oligomer of the (B) component with respect to the epoxy equivalent of the epoxy resin of the (C) component, and the chloride ion concentration in the resin composition is 230 ppm or less.

In the resin composition according to the present invention, the curing accelerator of the (C) component is preferably an imidazole curing accelerator or a tertiary amine compound.

The resin composition according to the present invention may further include (E) a filler.

In the resin composition according to the present invention, the filler of the (E) component is preferably a silica filler or a talc filler.

The resin composition according to the present invention may further include (F) a stabilizer.

In the resin composition according to the present invention, the stabilizer of the (F) component is preferably isopropyl borate, aluminum chelate, or barbituric acid.

In addition, the present invention provides a one-component adhesive agent including the resin composition according to the present invention.

Moreover, the present invention provides a cured resin obtained by heating the resin composition.

Furthermore, the present invention provides an image sensor module manufactured with the one-component adhesive agent according to the present invention.

In addition, the present invention provides an electronic component manufactured with the one-component adhesive agent according to the present invention.

Effects of the Invention

The resin composition according to the present invention can be thermoset at a temperature of approximately 80° C., and has excellent PCT resistance and a long pot life. Therefore, this resin composition is suitable as a one-component adhesive agent to be used during the manufacture of image sensor modules or electronic components.

DESCRIPTION OF THE EMBODIMENTS

The resin composition according to the present invention will be described in detail below.

The resin composition according to the present invention includes, as essential components, (A) to (D) components indicated below.

(A) Component: Compound Represented by Formula (1) below:

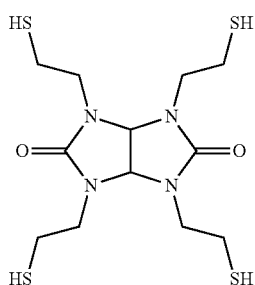

The compound represented by formula (1) has four thiol groups in the compound. This compound acts as a curing agent of an epoxy resin as the (C) component. In known thiol adhesive agents, such as adhesive agents disclosed in Patent Literatures 1 and 2, there are used, as a curing agent of the epoxy resin, polythiol compounds such as pentaerythritol tetrakis(3-mercaptopropionate) (trade name "PEMP" manufactured by SC Organic Chemical Co., Ltd.), trimethylolpropane tris(3-mercaptopropionate) (trade name "TMMP" manufactured by SC Organic Chemical Co., Ltd.), tris-[(3-mercaptopropionyloxy)-ethyl]-isocyanurate (trade name "TEMPIC" manufactured by SC Organic Chemical Co., Ltd.), dipentaerythritol hexakis(3-mercaptopropionate) (trade name "DPMP" manufactured by SC Organic Chemical Co., Ltd.), and tetraethylene glycol bis(3-mercaptopropionate) (trade name "EGMP-4" manufactured by SC Organic Chemical Co., Ltd.). However, all of these polythiol compounds have an ester bond. The fact that the ester bond is hydrolyzed under a high-temperature and high-humidity environment like in a PCT, causing the decrease of adhesive strength, is considered as a reason why known thiol adhesive agents have insufficient PCT resistance.

In contrast to this, the compound of formula (1) does not have an ester bond. Therefore, the cleavage of a cross-linked structure caused by hydrolysis does not occur under a high-temperature and high-humidity environment like in a PCT. As a result, the adhesive strength is unlikely to be decreased. Thus, the PCT resistance improves.

However, the compound of formula (1) has a rigid structure with high symmetry. Therefore, attention needs to be paid to the fact that the compound is likely to be crystallized. It is difficult to control the crystallization of the compound of formula (1). This crystallization causes the composition and physical properties of the resin composition to vary. Therefore, this crystallization becomes a problem when the compound is used as a one-component adhesive agent.

The resin composition according to the present invention includes as the (B) component an oligomer having as the basic skeleton a structure represented by formula (2) below. This inhibits the crystallization of the compound of formula (1).

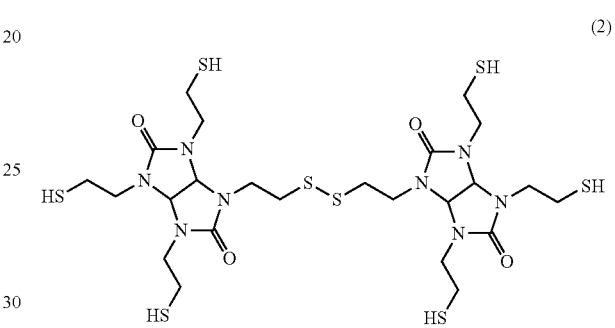

The structure represented by formula (2) above is a structure which contains a dimer generated by the formation of a sulfide bond between an —SH group of the compound of formula (1) and an —SH group of another compound of formula (1). Therefore, the compound of formula (2) can be obtained by forming a disulfide through the oxidation reaction of the compound represented by formula (1). In the formation of a disulfide, a trimer or a tetramer each generated by forming a sulfide bond between an —SH group of the compound of formula (2) and an —SH group of further another compound of formula (1) is also obtained. It is noted that these trimer and tetramer also exert the effect of suppressing the crystallization of the compound of formula (1). Therefore, these trimer and tetramer can be used as the oligomer of the (B) component. Since these trimer and tetramer are also included in the (B) component, the (B) component is defined as the oligomer having as its basic skeleton the structure represented by formula (2). However, when compounding the (B) component containing the trimer or tetramer having a molecular weight larger than that of a dimer, there is a risk that the viscosity of the resin composition might increase. Therefore, a dimer, that is, the oligomer having the structure of formula (2), is preferably included as the main component. Specifically, the ratio of the oligomer (dimer) having the structure of formula (2) to the oligomer of the (B) component is preferably 80% or more, more preferably 85% or more, and further preferably 90% or more.

It is noted that the oligomer of the (B) component having in its structure a plurality of thiol groups (six thiol groups in the case of the structure of formula (2)) also acts as the curing agent of the epoxy resin of the (C) component.

For exerting the effect of suppressing the crystallization of the compound of formula (1), the oligomer of the (B) component needs to be compounded in a predetermined amount. However, when the compounding amount of the oligomer of the (B) component is excessive, there is a problem that the viscosity of the resin composition increases. Therefore, in the resin composition according to the present invention, the mass ratio ((B)/(A)×100) between the compound of the (A) component and the oligomer of the (B) component is 5 to 25%. When the mass ratio is lower than 5%, the crystallization-suppressing effect by formula (1) is insufficient. On the other hand, when the mass ratio is higher than 25%, there is a problem that the viscosity of the resin composition increases. The mass ratio is preferably 10 to 12%.

In the manufacturing process of the compound of the (A) component and the oligomer of the (B) component, hydrochloric acid is used. Therefore, the compound of the (A) component and the oligomer of the (B) component are sometimes contaminated with chloride ions, as impurities, generated as a by-product from the hydrochloric acid. When the resin composition according to the present invention is contaminated with chloride ions as impurities, there is a risk that the storage stability of the resin composition according to the present invention might decrease. As a result, there is a risk that the spot life might be shortened.

The curing reaction of the epoxy resin of the (C) component proceeds by the following mechanism, in the case of anionic polymerization as an example.
(1) A base catalyst attracts a proton (H$^+$) from a thiol group (—SH) of the compound of the (A) component or the oligomer of the (B) component. Then, a thiolate ion (—S—) is generated.
(2) The thiolate ion (—S—) generated in the mechanism of (1) opens the ring of an epoxy group. Then, a polymerization reaction of the epoxy resin proceeds.

When the resin composition according to the present invention is contaminated with chloride ions as impurities, there is observed a phenomenon in which an undesired curing reaction of the epoxy resin of the (C) component proceeds during the storage of the resin composition, causing the pot life of the resin composition to be shortened. However, the detailed reaction mechanism of this curing reaction is unknown.

In the present invention, the chloride ion concentration in the resin composition is defined to be 230 ppm or less, thereby improving the storage stability of the resin composition. Accordingly, the resin composition having a long pot life is achieved.

An example of the method for reducing the chloride ion concentration in the resin composition includes washing the compound of the (A) component and the oligomer of the (B) component, which are used for the preparation of the resin composition, with pure water or an organic solvent. Washing with pure water and an organic solvent may be used in combination.

The chloride ion concentration in the resin composition according to the present invention is preferably 150 ppm or less, and more preferably 50 ppm or less.

(C) Component: Epoxy Resin

The epoxy resin of the (C) component is a component which serves as a main agent of the resin component according to the present invention.

As the epoxy resin of the (C) component, there can be used any resin which has two or more epoxy groups in one molecule. Examples of the epoxy resin of the (C) component may include polyhydric phenol such as bisphenol A, bisphenol F, bisphenol AD, catechol, and resorcinol, polyglycidyl ether obtained by the reaction between polyhydric alcohol such as glycerin or polyethylene glycol and epichlorhydrin, glycidyl ether ester obtained by the reaction between hydroxycarboxylic acid such as p-hydroxybenzoic acid and 3-hydroxynaphthoic acid, and epichlorohydrin, polyglycidyl ester obtained by the reaction between polycarboxylic acid such as phthalic acid or terephthalic acid and epichlorhydrin, and an epoxy resin having a naphthalene skeleton such as 1,6-bis(2,3-epoxypropoxy)naphthalene. Further examples may include an epoxidized phenolic novolac resin, an epoxidized cresol novolac resin, epoxidized polyolefin, a cyclic aliphatic epoxy resin, a urethane-modified epoxy resin, and a silicone-modified epoxy resin. However, the above-described epoxy resin is not limited to these.

In the resin composition according to the present invention, the total content of the compound of the (A) component and the oligomer of the (B) component is 0.5 equivalents to 2.5 equivalents in terms of the ratio of the thiol equivalent of the compound of the (A) component and the oligomer of the (B) component with respect to the epoxy equivalent of the epoxy resin of the (C) component. When the total content of the compound of the (A) component and the oligomer of the (B) component as a curing agent of the epoxy resin of the (C) component is lower than the lower limit (0.5 equivalents), the adhesive strength of the resin composition significantly decreases. When the total content of the compound of the (A) component and the oligomer of the (B) component is higher than the upper limit (2.5 equivalents), the amount of the compound of the (A) component and the oligomer of the (B) component, which do not contribute to a curing reaction, increases (in terms of the thiol equivalent ratio). Therefore, the PCT resistance of the resin composition decreases.

The total content of the compound of the (A) component and the oligomer of the (B) component is preferably 0.6 equivalents to 2.3 equivalents in terms of the ratio of the thiol equivalent of the compound of the (A) component and the oligomer of the (B) component with respect to the epoxy equivalent of the epoxy resin of the (C) component.

(D) Component: Curing Accelerator

A curing accelerator of the (D) component is not particularly limited. Any known curing accelerator can be used as the curing accelerator of the epoxy resin of the (C) component. However, an imidazole curing accelerator or a tertiary amine compound has a high curing speed for the resin composition. Therefore, these curing accelerators are preferable when thermosetting at 80° C. is performed. An imidazole curing accelerator is more preferable.

Specific examples of the imidazole curing accelerator may include imidazole compounds such as 2-methylimidazole, 2-undecylimidazole, 2-heptadecylimidazole, 2-ethyl-4-methylimidazole, 2-phenylimidazole, and 2-phenyl-4-methylimidazole. Also, an imidazole compound obtained by enclosing these imidazole compounds with an inclusion compound such as 1,1,2,2-tetrakis-(4-hydroxyphenyl)ethane or 5-hydroxyisophthalic acid may be used.

Furthermore, encapsulated imidazole called microcapsule-type imidazole or epoxy adduct-type imidazole can also be used. That is, there can be used an imidazole latent curing agent encapsulated by producing an imidazole compound adducted with urea or an isocyanate compound and further blocking the surface of the obtained product with an isocyanate compound. Also, there can be used an imidazole latent curing agent encapsulated by producing an imidazole compound adducted with an epoxy compound and further blocking the surface of the obtained product with an isocyanate compound. Specific examples thereof may include Novacure HX3941HP, Novacure HXA3942HP, Novacure HXA3922HP, Novacure HXA3792, Novacure HX3748, Novacure HX3721, Novacure HX3722, Novacure HX3088, Novacure HX3741, Novacure HX3742, and Novacure HX3613 (manufactured by Asahi Kasei Chemicals Corporation, trade names), Amicure PN-23J, Amicure PN-40J, and Amicure PN-50 (manufactured by Ajinomoto Fine-Techno Co., Inc., trade names), and Fujicure FXR-1121 (manufactured by Fujikasei Kogyo Co., LTD., trade name).

Specific examples of the tertiary amine compound may include Fujicure FXR-1020 and Fujicure FXR-1030 (manufactured by Fujikasei Kogyo Co., LTD., trade names), and Amicure MY-24 (manufactured by Ajinomoto Fine-Techno Co., Inc., trade name).

The suitable range of the content of the curing accelerator of the (D) component depends on the type of the curing accelerator. In the case of an imidazole compound, the suitable range is, with respect to 100 parts by mass of the epoxy resin as the (C) component, preferably 0.3 to 40 parts by mass, more preferably 0.5 to 20 parts by mass, and further preferably 1.0 to 15 parts by mass.

The suitable range for the tertiary amine compound is, with respect to 100 parts by mass of the epoxy resin as the (C) component, preferably 0.3 to 40 parts by mass, more preferably 0.5 to 20 parts by mass, and further preferably 1.0 to 15 parts by mass.

The resin composition according to the present invention may include, other than the above-described (A) to (D) components, the below-described components as necessary.

(E) Component: Filler

When the resin composition according to the present invention is used as a one-component adhesive agent, a filler is preferably included as an (E) component.

When the resin composition according to the present invention is used as a one-component adhesive agent, the inclusion of the filler as the (E) component allows a bonded site to have improved moisture resistance and thermal cycle resistance, especially improved thermal cycle resistance. The improvement of thermal cycle resistance by the use of the filler is attributable to the decrease in linear expansion coefficients which suppresses the expansion and contraction of the cured resin composition caused by a thermal cycle.

The filler as the (E) component is not particularly limited. There can be used any filler which has the effect of reducing the linear expansion coefficient when added. Specific examples of the filler may include a silica filler, an alumina filler, and a talc filler. Among these, a silica filler is preferable, because the filling amount can be increased. Also, when a talc filler is used, the elastic modulus of a cured product of the resin composition becomes lower than that when a silica filler is used. Therefore, a bonded site has excellent toughness.

It is noted that the filler as the (E) component may be a filler having a surface which has been treated with a silane coupling agent or the like. When this filler having a treated surface is used, the effect of preventing aggregation of the filler can be expected. Thus, the storage stability of the resin composition according to the present invention is expected to improve.

The average particle size of the filler as the (E) component is preferably 0.007 to 10 μm, and more preferably 0.1 to 6 μm.

Here, the shape of the filler is not particularly limited. The form of the filler may be spherical, indefinite, scaly, or the like. It is noted that when the shape of the filler is other than spherical, the average particle size of the filler means the average maximum diameter of the filler.

When the filler is included as the (E) component, the content of the filler in the resin composition according to the present invention is, with respect to 100 parts by mass in total of the (A) to (D) components, preferably 5 to 400 parts by mass, more preferably 5 to 200 parts by mass, and further preferably 5 to 120 parts by mass.

(F) Component: Stabilizer

A stabilizer may be included as an (F) component for further improving the storage stability of the resin composition according to the present invention thereby to further lengthen the pot life of the resin composition.

As a stabilizer for a one-component adhesive agent including as its main agent an epoxy resin, there can be used any known stabilizers. Specific examples of the stabilizers may include boric acid ester (trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate, triethanolamine borate, and isopropyl borate), aluminum chelate, titanium chelate, and organic acid (such as barbituric acid). Among these, isopropyl borate is preferable, because it is liquid and excellent in workability.

When the stabilizer is included as the (F) component, the content of the stabilizer in the resin composition according to the present invention is, with respect to 100 parts by mass in total of the (A) to (D) components, preferably 0.01 to 30 parts by mass, more preferably 0.05 to 25 parts by mass, and further preferably 0.1 to 20 parts by mass.

(G) Component: Coupling Agent

The resin composition according to the present invention may include a coupling agent as a component (G), in order to improve PCT resistance.

Examples of the coupling agent of the (G) component to be used may include various silane coupling agents based on epoxy, amino, vinyl, methacryl, acryl, mercapto, and the like. Specific examples of the silane coupling agent may include 3-glycidoxypropyltrimethoxysilane, 2-(3,4-epoxycyclohexyl)ethyltrimethoxysilane, 3-methacryloxypropyltrimethoxysilane, and 8-glycidoxyoctyltrimethoxysilane. Among these, 3-glycidoxypropyltrimethoxysilane is preferable, because it is effective in the improvement of adhesive strength.

From the viewpoint of the improvement in PCT resistance, the content of the coupling agent of the (G) component is, with respect to 100 parts by mass in total of the (A) to (D) components, preferably 0.2 to 50 parts by mass, and more preferably 0.5 to 30 parts by mass.

From the viewpoint of improvement in PCT resistance, the content of the coupling agent of the (G) component is preferably 1:0.002 to 1:1, and more preferably 1:0.002 to 1:0.4, in terms of the equivalent ratio between the thiol group of the compound of the (A) component and the oligomer of the (B) component, and Si of the coupling agent of the (G) component.

The content of the coupling agent of the (G) component is more preferably 1:0.002 to 1:0.4, in terms of the equivalent ratio between the thiol group of the compound of the (A) component and the oligomer of the (B) component, and Si of the coupling agent of the (G) component.

(Other Compounding Agents)

The resin composition according to the present invention may further include a component other than the above-described (A) to (G) components, as necessary. Specific examples of such a component to be compounded may include an ion trapping agent, a leveling agent, an antioxidant, an antifoaming agent, a flame retardant, a coloring agent, and an ion trapping agent. The type and compounding amount of each compounding agent are according to the method known in the art.

The resin composition according to the present invention is prepared by mixing the above-described (A) to (D) components, the (E) to (G) components (when these components are to be included), and other compounding agents compounded as necessary, and thereafter stirring the mixture with a Henschel mixer or the like.

When the resin composition according to the present invention is used as a one-component adhesive agent, the one-component adhesive gent is applied onto a site to be bonded, and thermoset at a temperature of approximately 80° C. The thermosetting time is preferably 10 to 180 minutes, and more preferably 30 to 60 minutes.

The one-component adhesive agent containing the resin composition according to the present invention is thermoset at a temperature of approximately 80° C. Therefore, this one-component adhesive agent is suitable as a one-component adhesive agent to be used during the manufacture of image sensor modules or electronic components.

Also, there is a possibility that the resin composition according to the present invention may be used as a liquid sealing material which is used during the manufacture of semiconductor devices.

The resin composition according to the present invention has favorable storage stability at normal temperature, and therefore, has a long pot life. As described herein, the thickening rate after the storage for 24 hours is an index of the pot life. This thickening rate is measured in accordance with a procedure described in later-described examples. The thickening rate after the storage for 24 hours of the resin composition according to the present invention, which is measured in accordance with a procedure described in later-described examples, is preferably 300% or less, more preferably 220% or less, and further preferably 150% or less.

The one-component adhesive agent obtained with the resin composition according to the present invention has sufficient adhesive strength. The measurement value of the adhesive strength varies depending on the measurement method. For example, the adhesive strength measured in accordance with the below-described procedure (shear strength, thermosetting at 80° C. for 60 min) is preferably 9 Kgf/chip or more, more preferably 10 Kgf/chip, and further preferably 15 Kgf/chip.

Evaluation Procedure of Adhesive Strength
(1) A sample is printed through a stencil on a glass epoxy substrate to have a diameter of 2 mm.
(2) An Si chip having a size of 2 mm×2 mm is placed on the printed sample. This is thermoset at 80° C. for 60 minutes with an air dryer.
(3) The shear strength is measured with a tabletop universal tester (1605HTP manufactured by Aikoh Engineering Co., Ltd.).

The one-component adhesive agent including the resin composition according to the present invention is not hydrolyzed in a high-temperature and high-humidity environment like in a PCT. Therefore, the adhesive strength is unlikely to decrease. Thus, the PCT resistance improves. Specifically, the persistence of adhesive strength (shear strength, curing at 80° C. for 60 min) before and after a PCT (pressure cooker test), represented by the following formula, is preferably 30% or more.

EXAMPLES

Hereinafter, the present invention will be described in detail by examples. However, the present invention is not limited to these examples.

(Preparation of Resin Composition)
Resin compositions were prepared by mixing components according to compositions illustrated in Tables 1 to 3 below. It is noted that in Tables 1 to 3, all of the numerals indicating the compounding ratios of the (A) to (E) components are expressed in parts by mass.

The components in Tables 1 to 3 are as follows.
(A) Component
TS-G: compound represented by formula (1) below (manufactured by Shikoku Chemicals Corporation, thiol group equivalent: 94)

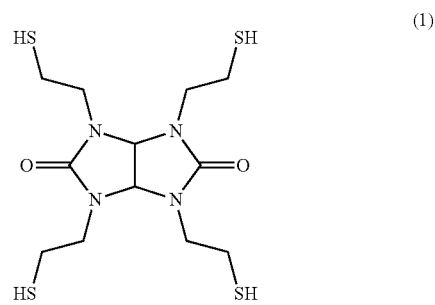 [SMILES: O=C1N(CCS)C2C(N1CCS)N(CCS)C(=O)N2CCS]

(B) Component
TS-G base dimer: dimer obtained by generating a disulfide through the oxidation reaction of TS-G (structure represented by formula (2) below, thiol group equivalent: 94)

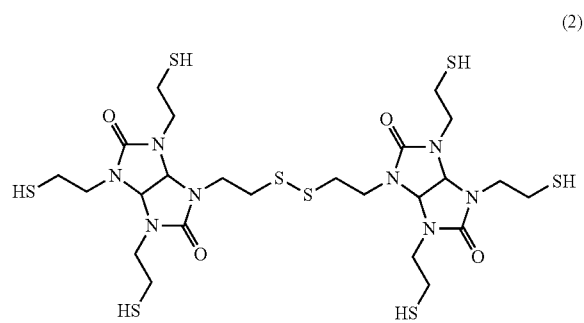 [SMILES: O=C1N(CCS)C2C(N1CCS)N(CCSSCCN1C(=O)N(CCS)C3C1N(CCS)C(=O)N3CCS)C(=O)N2CCS]

(C) Component
ZX1658GS: cyclohexanedimethanol diglicidyl ether (manufactured by Nippon Steel Chemical Co., Ltd., epoxy equivalent: 135)
(D) Component
HXA3922HP: Novacure HXA3922HP (imidazole latent curing accelerator, manufactured by Asahi Kasei Chemicals Corporation, (1/3: imidazole adduct product, 2/3: epoxy resin), epoxy equivalent: 180)
(E) Component
Silica filler: manufactured by Admatechs Company Limited
Talc filler: (5000PJ manufactured by Matsumura Sangyo Co., Ltd.)
(F) Component
TIPB: isopropyl borate (manufactured by Tokyo Chemical Industry Co., Ltd.)

The concentration (ppm) of chloride ions in the prepared resin composition was measured in the following procedure. In a sample tube, 0.2 g of TS-G is completely dissolved with 20 mL of added chloroform. Into the sample tube, 20 mL of distilled water is added. Thereafter, the sample tube is covered with a lid. The sample tube is vigorously shaken for one minute. The contents poured into a separatory funnel is left to stand until the interface becomes apparent. The chloride ion concentration in the removed aqueous layer (upper layer) is analyzed by ion chromatography.

(Initial Viscosity, and Thickening Rate after Storage for 24 Hours)

The viscosity (Pa·s) of the prepared resin composition at 50 rpm and 25° C. was measured as the initial viscosity, using a rotary viscometer HBDV-1 (with spindle SC4-14) manufactured by Brookfield Engineering Laboratories., Inc. Next, the resin composition poured in a closed container was stored at a temperature of 25° C. and a humidity of 50% for 24 hours. The viscosity of the resin composition at that time was measured in a similar procedure. Then, the ratio of this viscosity relative to the viscosity immediately after the preparation was calculated, thereby to obtain a thickening rate (thickening rate after storage for 24 hours) as an index of the pot life.

(Curing Properties (80° C., 60 Min))

The curing properties of the prepared resin composition was evaluated in the following procedure.

An aluminum pan for DSC was filled with approximately 5 mg of the prepared resin composition. This was thermoset at 80° C. for 60 minutes with an air dryer. Thereafter, the change of calories during the process of raising temperature at 5° C./min to a predetermined temperature is measured, using a differential scanning calorimeter (DSC204 F1 Phoenix manufactured by DSC NETZSCH). When a further curing reaction (residual exothermicity) is not indicated, it is determined that the curing of the resin composition at 80° C. for 60 minutes has been completed.

TABLE 1

|   |   | Example 1 | Example 2 | Example 3 | Example 4 | Example 5 |
|---|---|---|---|---|---|---|
| (A) Component | TS-G | 100 | 100 | 100 | 100 | 100 |
| (B) Component | TS-G base dimer | 8.8 | 14.4 | 14.9 | 16.1 | 8.8 |
| (C) Component | ZX1658GS | 47.1 | 48.7 | 48.9 | 49.2 | 46.9 |
| (D) Component | HXA3922HP | 53.2 | 55.7 | 55.9 | 56.5 | 53.5 |
| (E) Component | Silica filler | 28.5 | 29.8 | 30.0 | 30.3 | 28.7 |
|   | Talc filler | — | — | — | — | — |
| (F) Component | TIPB | — | — | — | — | 1.1 |
| Total |   | 237.6 | 248.7 | 249.7 | 252.1 | 239.0 |
| Chloride ion concentration [ppm] |   | 25.6 | 40.3 | 126.5 | 4.9 | 25.6 |
| Amount of thiol functional group (Components (A) + (B)) |   | 1.13 | 1.18 | 1.18 | 1.19 | 1.13 |
| Amount of epoxy functional group (Component (C)) |   | 0.57 | 0.59 | 0.59 | 0.60 | 0.57 |
| Thiol/epoxy equivalent ratio |   | 2.00 | 2.00 | 2.00 | 2.00 | 2.00 |
| Component (B)/component (A) mass ratio (%) ((parts by mass/parts by mass) × 100) |   | 8.8 | 14.4 | 14.9 | 16.1 | 8.8 |
| Initial viscosity [Pa · s at 50 rpm] |   | 8 | 17 | 17 | 20 | 8 |
| Thickening rate after storage for 24 hours |   | 190 | 220 | 300 | 180 | 100 |
| (Curing properties (80° C., 60 minutes)) |   | Good | Good | Good | Good | Good |

TABLE 2

|   |   | Example 6 | Example 7 | Example 8 | Example 9 | Example 10 |
|---|---|---|---|---|---|---|
| (A) Component | TS-G | 100 | 100 | 100 | 100 | 100 |
| (B) Component | TS-G base dimer | 14.4 | 14.9 | 16.1 | 16.1 | 25.0 |
| (C) Component | ZX1658GS | 48.5 | 48.7 | 49.0 | 49.0 | 51.8 |
| (D) Component | HXA3922HP | 56.0 | 56.3 | 56.8 | 56.8 | 60.4 |
| (E) Component | Silica filler | 30.0 | 30.1 | 30.4 | 0.0 | 32.3 |
|   | Talc filler | — | — | — | 30.4 | — |
| (F) Component | TIPB | 1.1 | 1.1 | 1.1 | 1.1 | — |
| Total |   | 250.1 | 251.2 | 253.6 | 253.6 | 269.6 |
| Chloride ion concentration [ppm] |   | 40.3 | 126.5 | 4.9 | 4.9 | 29.0 |
| Amount of thiol functional group (Components (A) + (B)) |   | 1.18 | 1.18 | 1.19 | 1.19 | 1.26 |
| Amount of epoxy functional group (Component (C)) |   | 0.59 | 0.59 | 0.60 | 0.60 | 0.63 |
| Thiol/epoxy equivalent ratio |   | 2.00 | 2.00 | 2.00 | 2.00 | 2.00 |

TABLE 2-continued

| | Example 6 | Example 7 | Example 8 | Example 9 | Example 10 |
|---|---|---|---|---|---|
| Component (B)/component (A) mass ratio (%) ((parts by mass/parts by mass) × 100) | 14.4 | 14.9 | 16.1 | 16.1 | 25.0 |
| Initial viscosity [Pa · s at 50 rpm] | 17 | 17 | 20 | 29 | 34 |
| Thickening rate after storage for 24 hours | 110 | 150 | 100 | 100 | 200 |
| (Curing properties (80° C., 60 minutes)) | Good | Good | Good | Good | Good |

TABLE 3

| | | Comparative Example 1 | Comparative Example 2 | Comparative Example 3 |
|---|---|---|---|---|
| (A) Component | TS-G | 100 | 100 | 100 |
| (B) Component | TS-G base dimer | 4.2 | 33.3 | 12.1 |
| (C) Component | ZX1658GS | 45.7 | — | 48.0 |
| (D) Component | HXA3922HP | 51.2 | — | 54.7 |
| (E) Component | Silica filler | 27.4 | — | 29.3 |
| | Talc filler | — | — | — |
| (F) Component | TIPB | — | — | — |
| | Total | 228.4 | 133.3 | 244.1 |
| | Chloride ion concentration [ppm] | 12.4 | — | 231.9 |
| | Amount of thiol functional group (Components (A) + (B)) | 1.10 | 1.33 | 1.16 |
| | Amount of epoxy functional group (Component (C)) | 0.55 | — | 0.58 |
| | Thiol/epoxy equivalent ratio | 2.00 | — | 2.00 |
| | Component (B)/component (A) mass ratio (%) ((parts by mass/parts by mass) × 100) | 4.2 | 33.3 | 12.1 |
| | Initial viscosity [Pa · s at 50 rpm] | Measurement disabled | — | 14 |
| | Thickening rate after storage for 24 hours | Measurement disabled | — | Measurement disabled |
| | (Curing properties (80° C., 60 minutes)) | Evaluation disabled | Evaluation disabled | Evaluation disabled |

In all of Examples 1 to 10, the evaluation result for the pot life was favorable, and the resin composition was thermoset at 80° C. for 60 minutes. Examples 2 to 10 are different from Example 1 as follows.

Examples 2 to 4, 10: The content of the oligomer of the (B) component is changed. Also, the chloride ion concentration is different from that in Example 1.

Example 5: The stabilizer of the (F) component is used.

Example 6: The stabilizer of the (F) component is used to Example 2.

Example 7: The stabilizer of the (F) component is used to Example 3.

Example 8: The stabilizer of the (F) component is used to Example 4.

Example 9: A talc filler is used as the (E) component to Example 8.

In Comparative Example 1 in which the compounding amount of the oligomer of the (B) component is excessively low, the compound of the (A) component was crystallized, so that the components could not be uniformly compounded. Therefore, the physical properties of the resin composition (initial viscosity, 24 hours thickening rate, and curing properties) were not evaluated.

In Comparative Example 2 in which the compounding amount of the oligomer of the (B) component is excessively high, the viscosity of the resin composition excessively increased during the preparation of the resin composition. Accordingly, the resin composition could not be obtained. Therefore, the physical properties of the resin composition (initial viscosity, 24 hours thickening rate, and curing properties) were not evaluated.

In Comparative Example 3 in which the chloride ion concentration is excessively high, the resin composition was thermoset at 80° C. for 60 minutes. However, the viscosity after storage for 24 hours had increased to a level that the measurement is disabled.

The invention claimed is:
1. A resin composition comprising:
(A) a compound represented by formula (1) below;

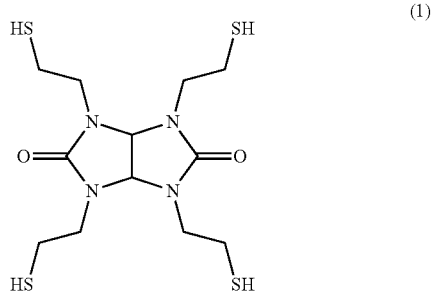 [SMILES: O=C1N(CCS)C2C(N1CCS)N(CCS)C(=O)N2CCS]

(B) an oligomer having as its basic skeleton a structure represented by formula (2) below;

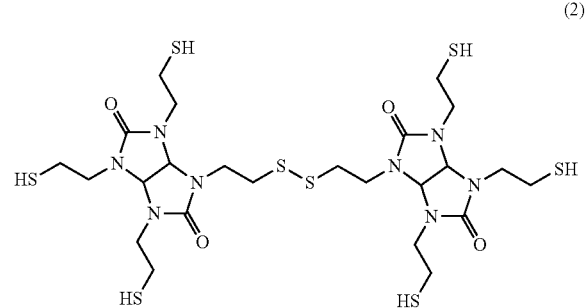 [SMILES: O=C1N(CCS)C2C(N1CCS)N(CCSSCCN1C(=O)N(CCS)C3C1N(CCS)C(=O)N3CCS)C(=O)N2CCS]

(C) an epoxy resin; and
(D) a curing accelerator, wherein
the mass ratio ((B)/(A)×100) between the compound of the (A) component and the oligomer of the (B) component is 5 to 25%,
the total content of the compound of the (A) component and the oligomer of the (B) component is 0.5 equivalents to 2.5 equivalents in terms of the ratio of the thiol equivalent of the compound of the (A) component and the oligomer of the (B) component with respect to the epoxy equivalent of the epoxy resin of the (C) component, and
a chloride ion concentration in the resin composition is 230 ppm or less.

2. The resin composition according to claim 1, wherein the curing accelerator of the (C) component is an imidazole curing accelerator or a tertiary amine compound.

3. The resin composition according to claim 1, further comprising (E) a filler.

4. The resin composition according to claim 3, wherein the filler of the (E) component is a silica filler or a talc filler.

5. The resin composition according to claim 1, further comprising (F) a stabilizer.

6. The resin composition according to claim 5, wherein the stabilizer of the (F) component is isopropyl borate, aluminum chelate, or barbituric acid.

7. The resin composition according to claim 1, further comprising (G) a coupling agent.

8. A one-component adhesive agent comprising the resin composition according to claim 1.

9. A cured resin obtained by heating the resin composition according to claim 1.

10. An image sensor module manufactured with the one-component adhesive agent according to claim 8.

11. An electronic component manufactured with the one-component adhesive agent according to claim 8.

12. The resin composition according to claim 2, further comprising (E) a filler.

13. The resin composition according to claim 2, further comprising (F) a stabilizer.

14. The resin composition according to claim 2, further comprising (G) a coupling agent.

15. A one-component adhesive agent comprising the resin composition according to claim 2.

16. A cured resin obtained by heating the resin composition according to of claim 2.

* * * * *